(12) United States Patent
Allaire

(10) Patent No.: US 10,081,374 B2
(45) Date of Patent: Sep. 25, 2018

(54) TRANSPORTATION SYSTEM AND DISPLACEMENT DEVICE THEREFOR

(71) Applicant: MOBILITES MONDIALES INC., Saint-Lambert, Quebec (CA)

(72) Inventor: Xavier Allaire, Saint-Lambert (CA)

(73) Assignee: MOBILITES MONDIALES INC., Saint Lambert (CA)

(*) Notice: Subject to any disclaimer, the term of this patent is extended or adjusted under 35 U.S.C. 154(b) by 166 days.

(21) Appl. No.: 14/888,124

(22) PCT Filed: Apr. 30, 2014

(86) PCT No.: PCT/CA2014/050408
§ 371 (c)(1),
(2) Date: Oct. 30, 2015

(87) PCT Pub. No.: WO2014/176694
PCT Pub. Date: Nov. 6, 2014

(65) Prior Publication Data
US 2016/0059868 A1      Mar. 3, 2016

Related U.S. Application Data

(60) Provisional application No. 61/817,398, filed on Apr. 30, 2013.

(51) Int. Cl.
*B61C 13/00* (2006.01)
*B61B 5/02* (2006.01)
(Continued)

(52) U.S. Cl.
CPC ................ *B61C 13/00* (2013.01); *B61B 5/02* (2013.01); *B61B 13/04* (2013.01); *B61B 13/125* (2013.01);
(Continued)

(58) Field of Classification Search
CPC .. B61B 3/00; B61B 3/02; B61B 13/00; B61B 13/04; B61B 13/08; B61B 13/10; B61B 13/12; B61C 13/00; B61C 13/04
See application file for complete search history.

(56) References Cited

U.S. PATENT DOCUMENTS 2,150,150 A    3/1939   Burrows et al.
3,591,241 A    7/1971   Allen
(Continued)

FOREIGN PATENT DOCUMENTS

CA    2540690 A1    4/2005
DE    3235218 A1    8/1984
(Continued)

OTHER PUBLICATIONS

International Search Report (ISR) and Written Opinion (WO) of corresponding international application PCT/CA2014/050408.

*Primary Examiner* — Robert J McCarry, Jr.
(74) *Attorney, Agent, or Firm* — Robert Brouillette; Brouillette Legal Inc.

(57) ABSTRACT

A transportation system including a tubular rail assembly, a displacement device with at least one helical propulsion system located in a first position to be received in one rail and movable to a second position to be received in another rail, a switching mechanism engaged to each propulsion system for movement between the first and second positions, and a transportation device outside of the rail assembly and attached to the displacement device. Also, a displacement device with at least one pair of support members each supporting a helical propulsion system, and a biasing member circumferentially biasing the support member of each pair in opposite directions. Also, a displacement device with at least one tubular support member surrounding the body and circumferentially movable with respect thereto and (Continued)

supporting a set of angled wheels, and a switching mechanism engaged to each member for actuating the circumferential movement.

21 Claims, 13 Drawing Sheets

(51) Int. Cl.
*B61B 13/04* (2006.01)
*B61B 13/12* (2006.01)
*E01B 25/08* (2006.01)
*E01B 25/22* (2006.01)

(52) U.S. Cl.
CPC .............. *E01B 25/08* (2013.01); *E01B 25/22* (2013.01); *Y02T 30/40* (2013.01)

(56) References Cited

U.S. PATENT DOCUMENTS

| | | |
|---|---|---|
| 3,866,538 A | 2/1975 | Forsey, Jr. |
| 3,903,808 A | 9/1975 | Foldes |
| 4,166,419 A | 9/1979 | Ardeleanu |
| 4,182,243 A | 1/1980 | Ceauselu |
| 6,044,769 A | 4/2000 | Oka et al. |
| 7,182,025 B2 | 2/2007 | Ghorbel et al. |
| 8,371,226 B2 * | 2/2013 | Timperman .............. B60V 3/04 104/23.1 |
| 2004/0244633 A1 | 12/2004 | Witmer |
| 2008/0173209 A1 | 7/2008 | Lechner |
| 2011/0218697 A1 | 9/2011 | Goldberg |

FOREIGN PATENT DOCUMENTS

| | | |
|---|---|---|
| DE | 3600235 A1 | 1/1987 |
| DE | 3725671 A1 | 8/1987 |
| DE | 4141426 A1 | 12/1991 |
| FR | 2690120 A1 | 10/1993 |
| JP | 06-293259 | 10/1994 |
| WO | 9204218 A1 | 3/1992 |
| WO | 2004108498 A2 | 12/2004 |

* cited by examiner

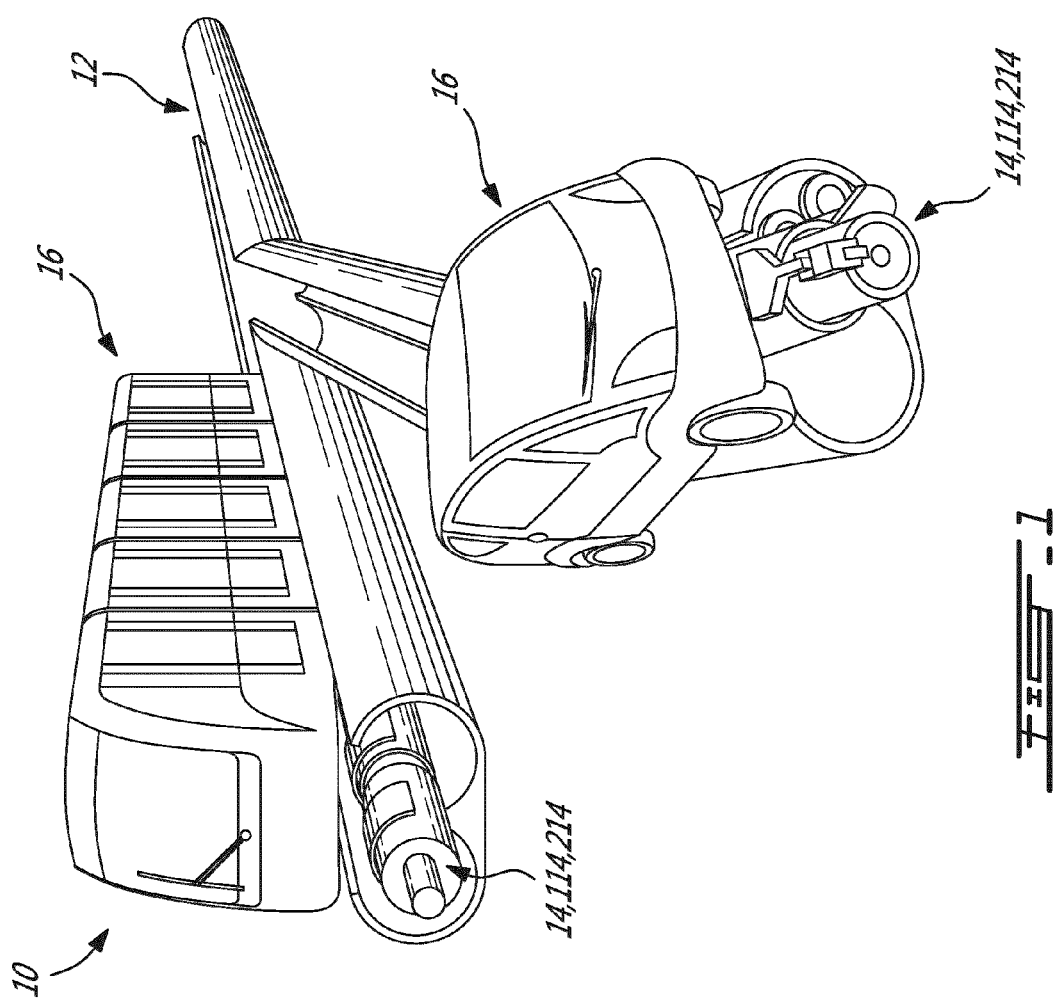

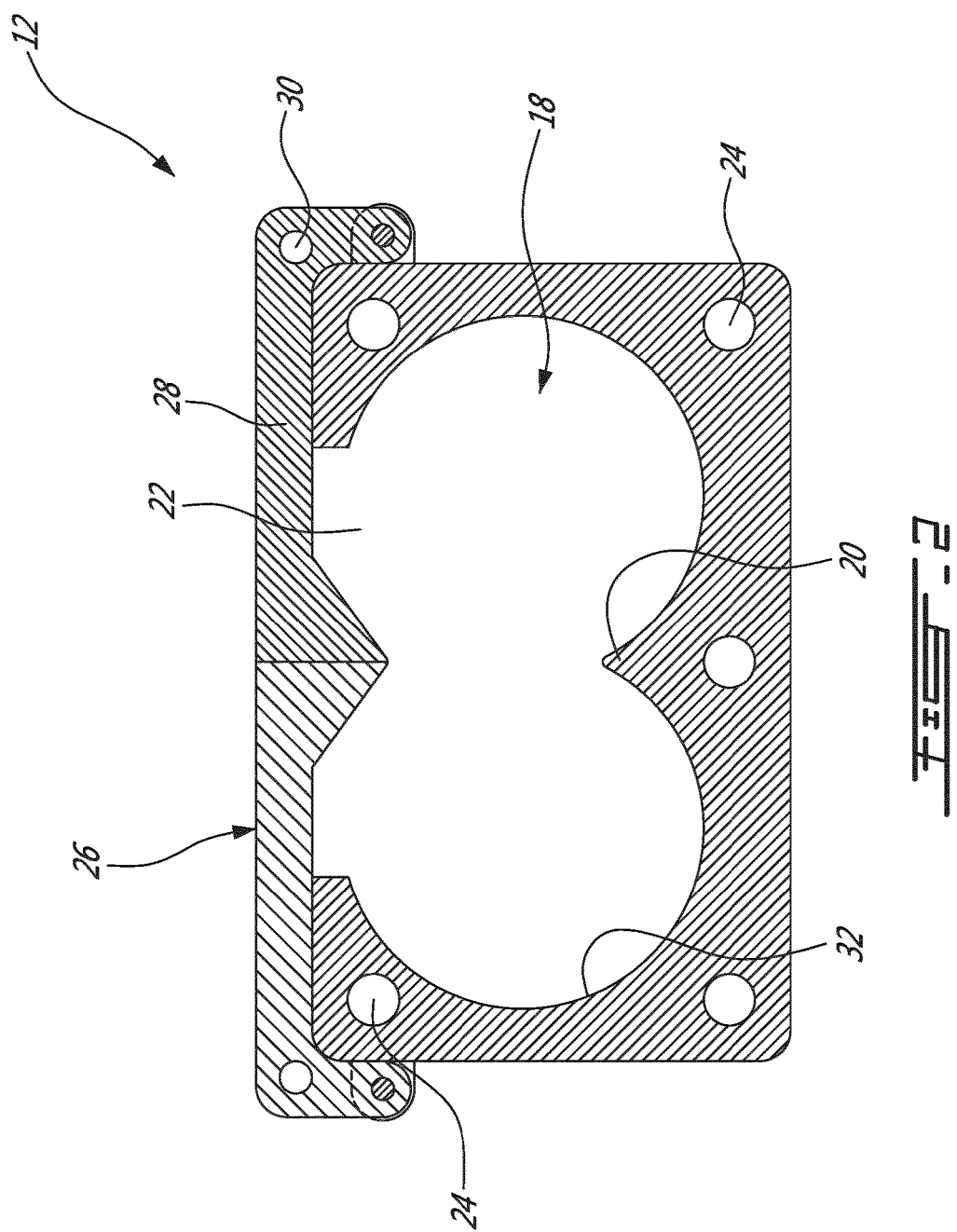

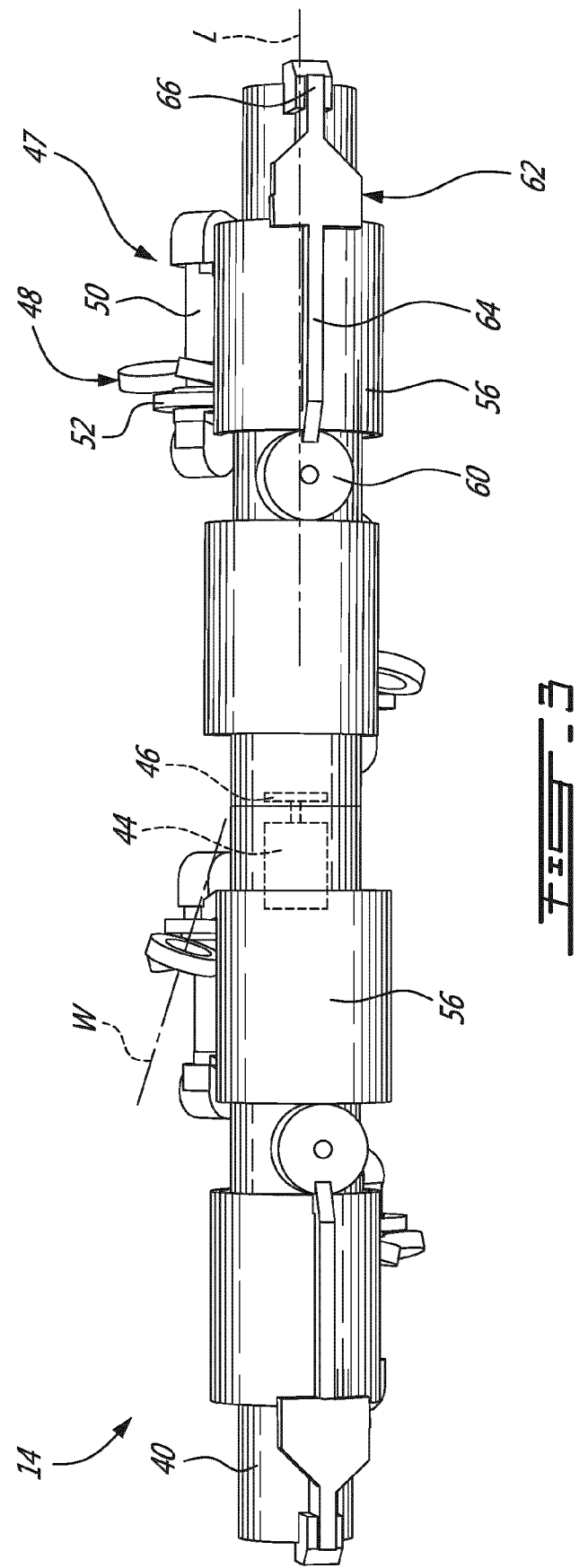

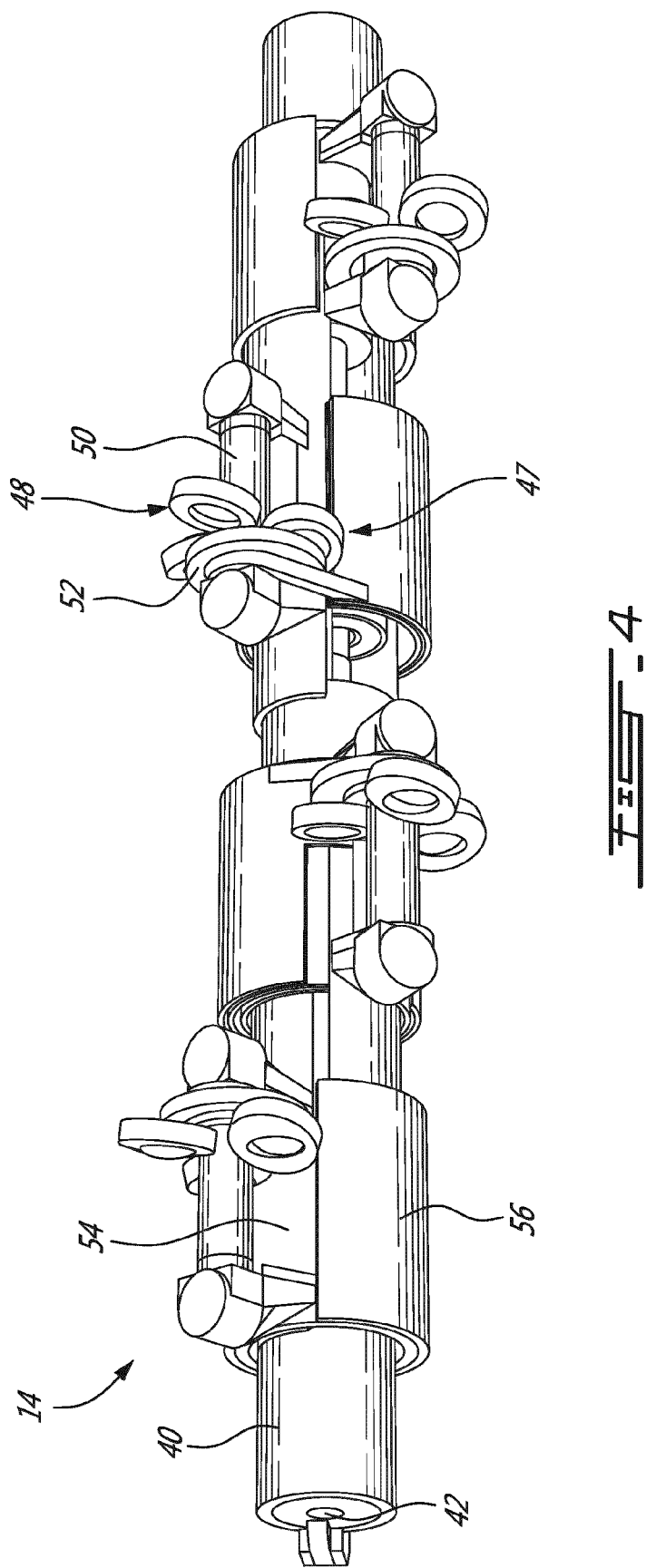

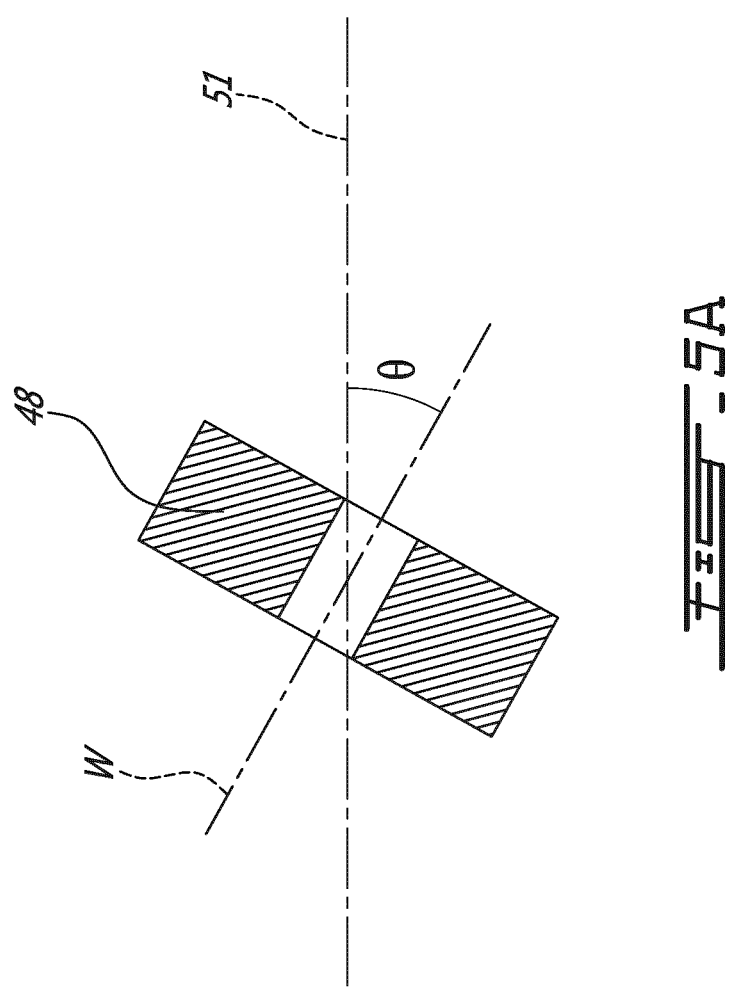

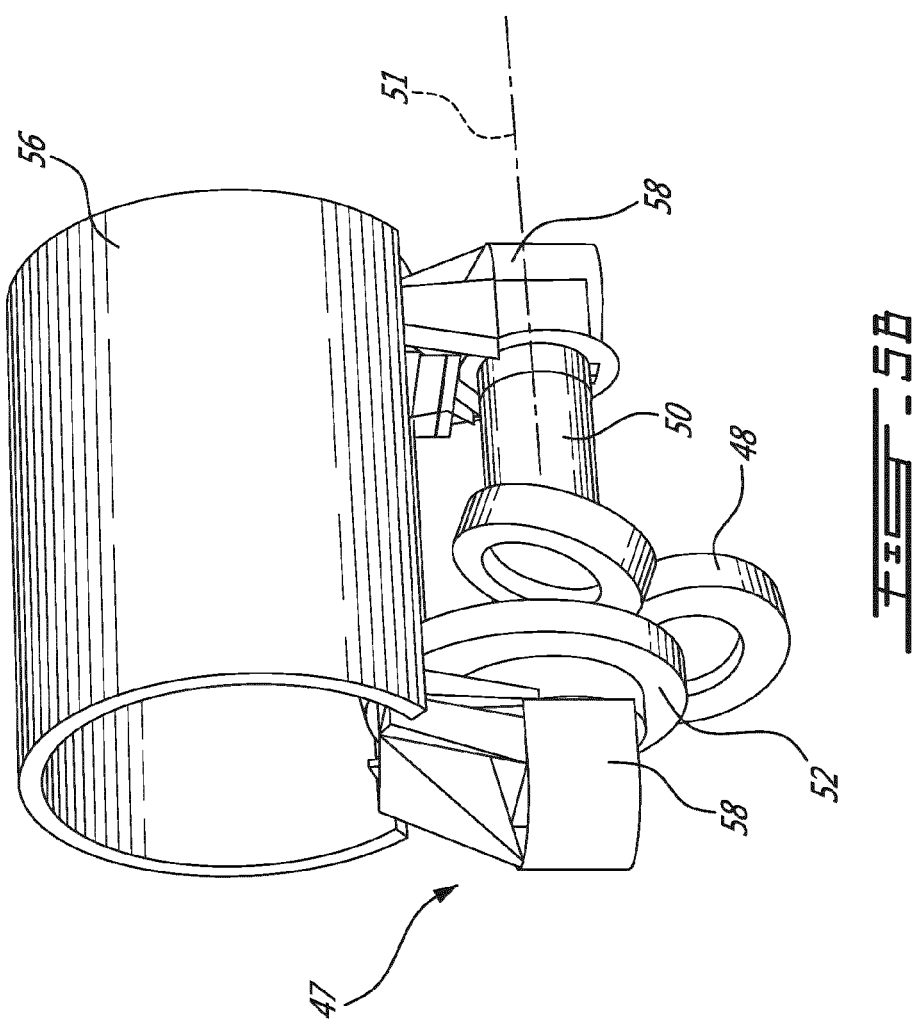

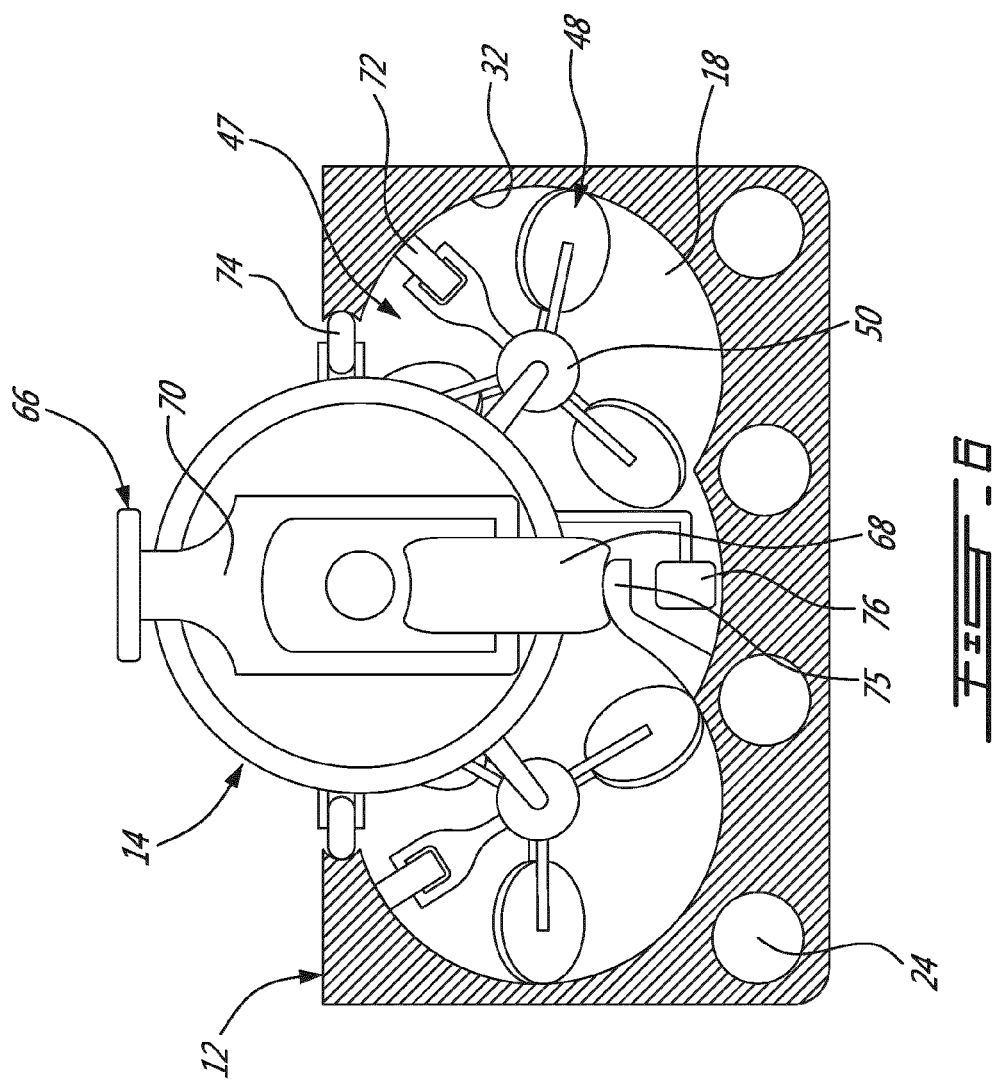

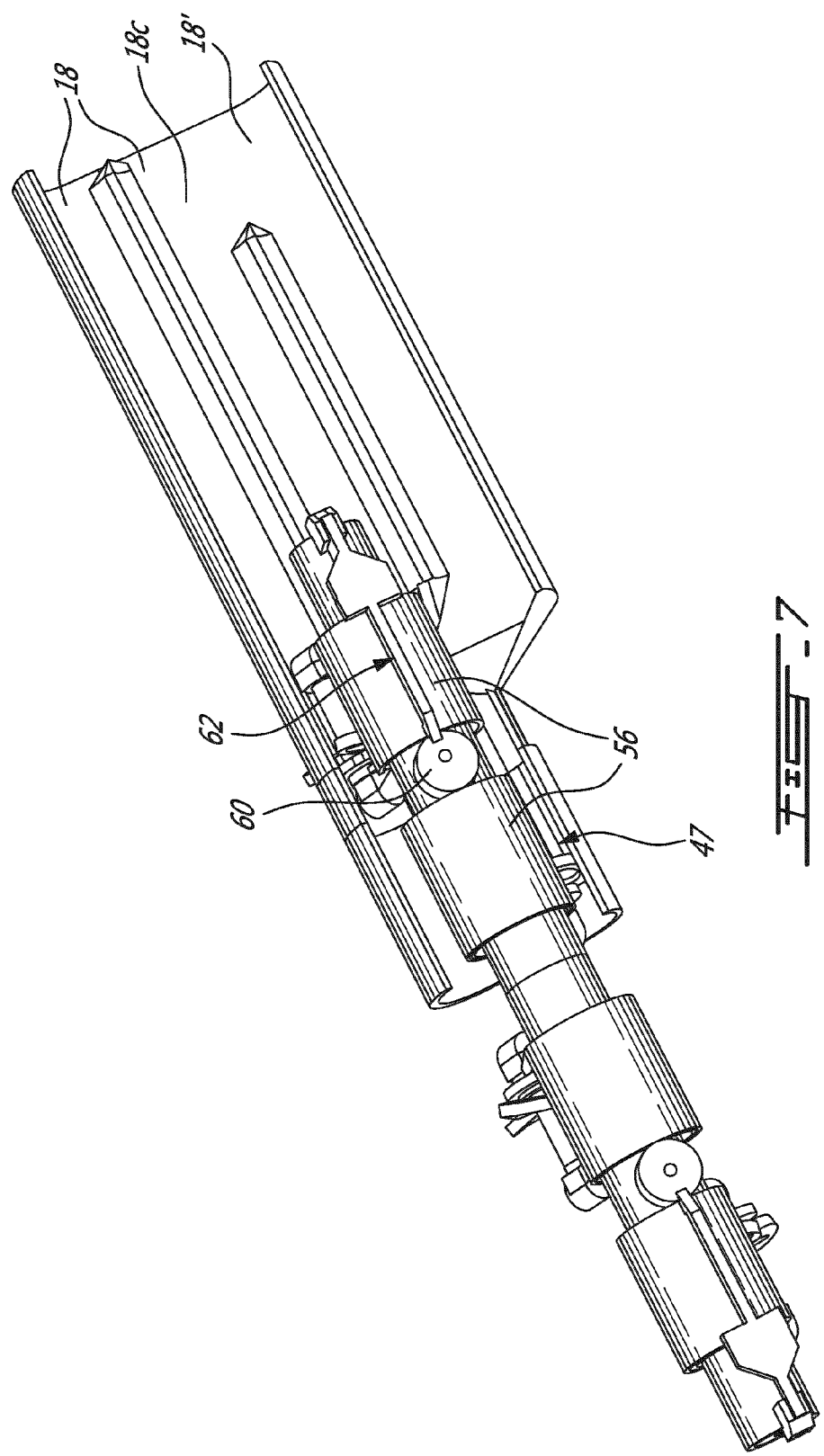

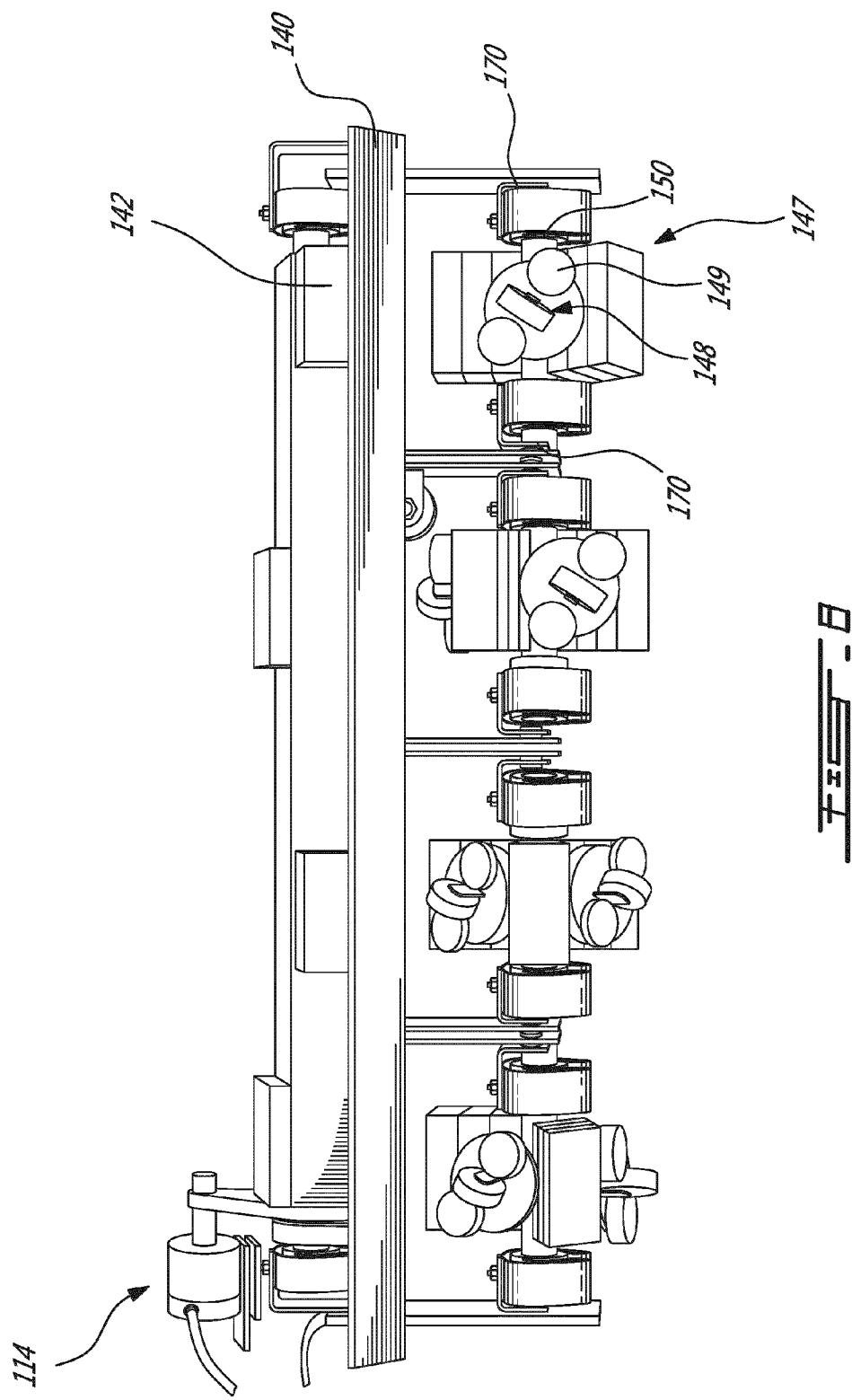

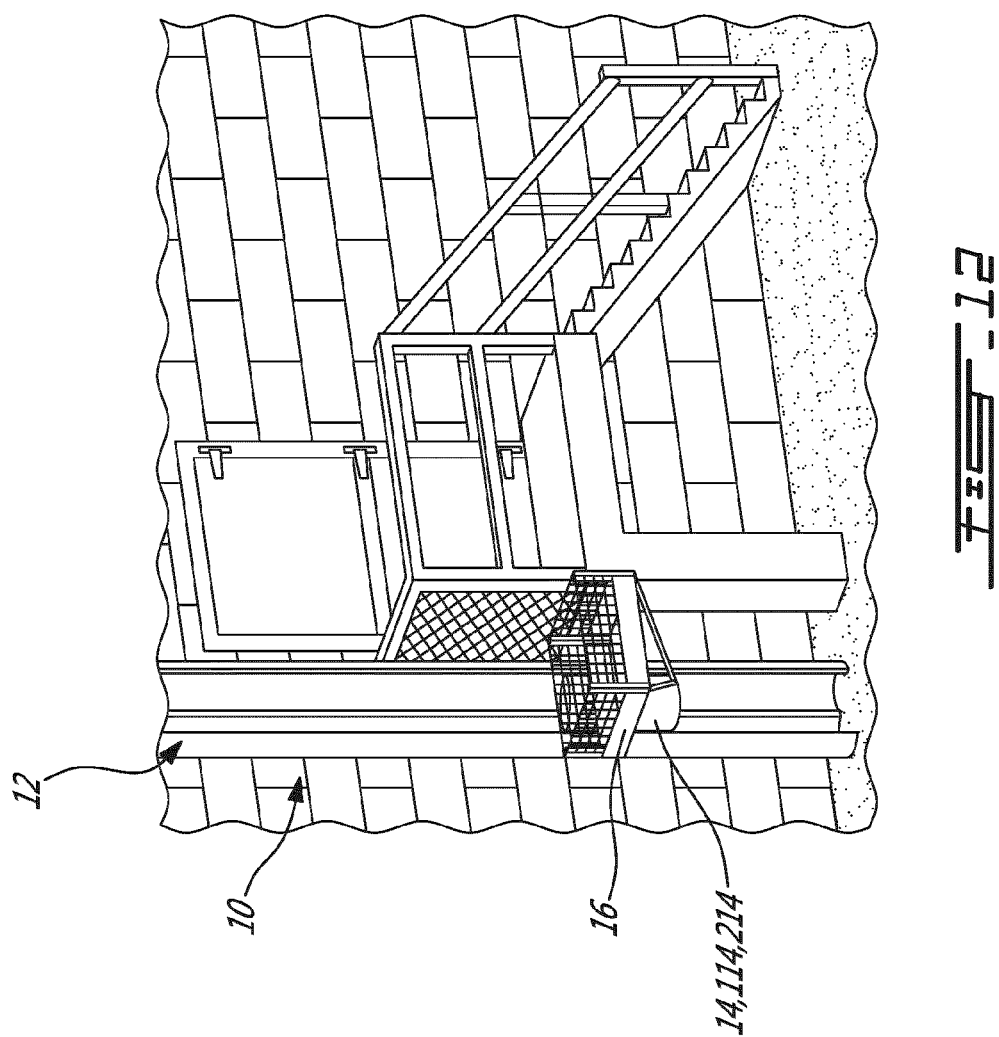

TRANSPORTATION SYSTEM AND DISPLACEMENT DEVICE THEREFOR

CROSS-REFERENCE TO RELATED APPLICATIONS

This application claims priority from U.S. provisional application No. 61/817,398 filed Apr. 30, 2013, the entire contents of which are incorporated by reference herein.

TECHNICAL FIELD

The application relates generally to transportation systems and, more particularly, to such systems using tubular rail assemblies.

BACKGROUND OF THE ART

Rail-based transportation system, whether using a single rail, two rails, or an electromagnetic levitation system, are typically expensive to deploy. They usually necessitate extensive and permanent modifications to the ground surface in order to provide for the necessary infrastructure. Deployments of such systems may also be limited by the available space and/or the conditions of the ground surface. Moreover, conventional rail infrastructures are generally not easily adaptable for use under water or on less stable soil.

Screw-type propelling devices have been used for propulsion of inspection robots inside of a pipe. Such robots are typically completely contained inside the pipe and include at least one set of wheels having a helical trajectory against the inner surface of the pipe to propel the robot along the longitudinal direction of the pipe. Attempts have also been made to use such propelling devices as a vehicular drive, but the need for improvement still remains.

SUMMARY

In one aspect, there is provided a transportation system comprising: a tubular rail assembly including along at least part of a length thereof at least two tubular rails extending side by side and each having an open circular cross-section; a movable displacement device having: a body, at least one engine, at least one helical propulsion system drivingly engaged to the at least one engine, each propulsion system being located in a first position received in one of the rails and engaged to an inner surface thereof, and being movable between the first position and a second position where the propulsion system is received in another one of the rails and engaged to an inner surface thereof, and a switching mechanism engaged to each set for movement between the first and second positions; and a transportation device located outside of the rail assembly, attached to the displacement device for displacement therewith.

In another aspect, there is provided a displacement device receivable within an open tubular rail, the mechanism comprising: a body having a longitudinal axis in use corresponding to a longitudinal axis of the rail assembly; at least one pair of support members engaged to the body and circumferentially movable with respect thereto, each support member supporting a driven helical propulsion system spaced apart from the body; and a biasing member circumferentially biasing the support member of each pair in opposite directions from one another.

In a particular embodiment, each helical propulsion system includes a rotatable support shaft spaced apart from the body and a set of rotatable angled wheels supported by the support shaft such as to be rotatable therewith about a central axis of the support shaft, the angled wheels of each set being rotatable about a respective axis extending at an angle greater than 0° and smaller than 90° with respect to the central axis of the support shaft to define a helical motion along the inner surface of the rails.

In a further aspect, there is provided a displacement device receivable within an open tubular rail, the mechanism comprising: an elongated body having a longitudinal axis in use corresponding to a longitudinal axis of the rail assembly; at least one tubular support member surrounding the body and connected thereto such as to be circumferentially movable with respect thereto, each support member rotationally supporting a support shaft spaced apart from and drivingly engaged to the main shaft, the support shaft supporting a set of angled wheels being rotatable about an axis extending at an angle greater than 0° and smaller than 90° with respect to the longitudinal axis of the body to define a helical driving motion, the angled wheels being drivingly engaged to at least one engine; and a switching mechanism engaged to each support member for actuating the circumferential movement thereof.

DESCRIPTION OF THE DRAWINGS

Reference is now made to the accompanying figures in which:

FIG. 1 is a schematic tridimensional view of a transportation system in accordance with a particular embodiment;

FIG. 2 is a schematic cross-sectional view of a rail assembly in accordance with a particular embodiment, which can be used in the transportation system of FIG. 1;

FIG. 3 is a schematic top tridimensional view of a displacement device in accordance with a particular embodiment, which can be used in the transportation system of FIG. 1;

FIG. 4 is a schematic bottom tridimensional view of the mechanism of FIG. 3;

FIG. 5A is a schematic illustration of the angle of wheels in the mechanism of FIG. 3;

FIG. 5B is a schematic side tridimensional view of a set of angled wheels and its support member in the mechanism of FIG. 3;

FIG. 6 is a schematic front view of the displacement device and rail assembly in accordance with another particular embodiment, in a transportation system such as shown in FIG. 1;

FIG. 7 is a schematic tridimensional view of the displacement device and rail assembly in accordance with a particular embodiment, in a transportation system such as shown in FIG. 1;

FIG. 8 is a side view of a displacement device in accordance with another particular embodiment, which can be used in the transportation system of FIG. 1;

FIG. 12 is a schematic tridimensional view of a transportation system in accordance with yet another particular embodiment.

DETAILED DESCRIPTION

Figure 9:
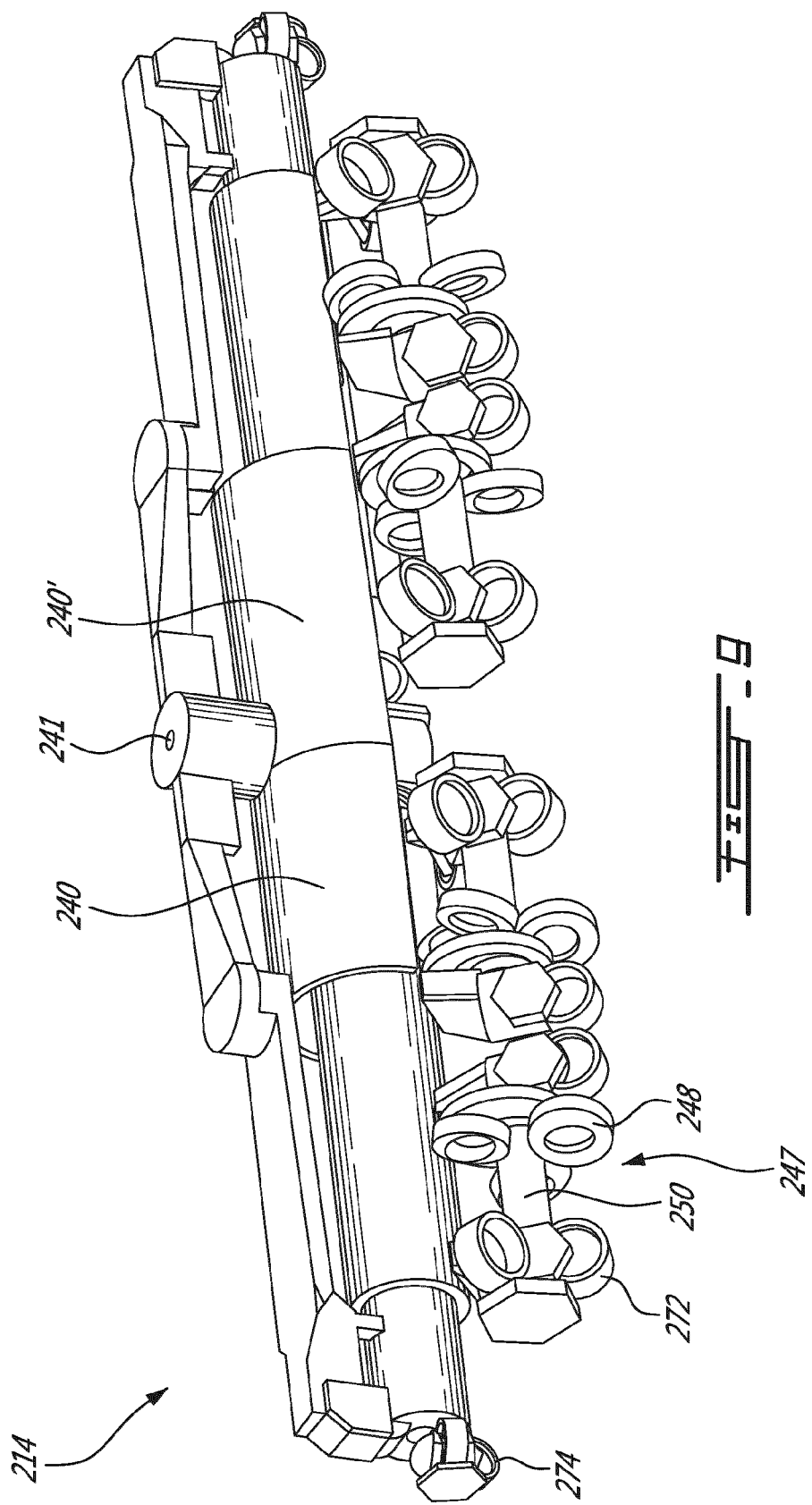
FIG. 9 is a schematic tridimensional view of a displacement device in accordance with another particular embodiment, which can be used in the transportation system of FIG. 1.

Referring to FIG. 1, a transportation system 10 according to a particular embodiment is schematically shown. The transportation system generally includes a tubular rail assembly 12, one or more displacement device(s) 14, 114 received in the rail assembly 12, and a transportation device 16 attached to each displacement device 14, 114 and extending outside of the rail assembly 12.

The rail assembly 12 includes at least one tubular rail having an open circular cross-section. Referring to FIG. 2, in a particular embodiment, the rail assembly includes two rails 18 extending side by side and each having an open circular cross section. In the embodiment shown, the rails share a common wall 20 such that the circumferential opening 22 defined in each cross-section communicate with one another to form a common opening in the rail assembly 12. As shown in FIG. 6 and as will be further detailed below, in embodiments where the rail assembly 12 includes multiple paths communicating with one another such that the displacement device 14, 114 can be moved between the communicating paths, the portions of the rail assembly 12 which define a junction between two paths include at least one additional tubular rail side by side with the other rails to enable the displacement device to circulate between the two paths.

In the particular embodiment shown, the rail assembly 12 includes a plurality of conduits 24 longitudinally defined therethrough, which may be used for example to circulate electrical power, clean water, waste water and/or sewage flow, telecommunication cables, etc. therethrough along the path(s) defined by the rail assembly 12. It is understood that more of less conduits 24 may be provided as required, or alternately the conduits 24 may be omitted. In an embodiment where electrical power is circulated through one or more of the conduits 24, such may be used to power the displacement device 14, 114, lighting systems, circulation lights, display panels, etc., and/or to recharge mobile electrical storage systems, and/or to circulate power between different facilities. The conduits 24 may be used for communication and logistics management between facilities for networks of mobile energy generation and storage systems, networks of mobile sanitary and water treatment facilities, networks of mobile communication means, networks of mobile shelter, housing and commercial appliances and infrastructures, networks of mobile food and drug distribution, networks of mobile health and education appliances and infrastructures, networks of mobile emergency and humanitarian appliances and infrastructures, networks of mobile agricultural, forestry, mining, construction, commercial and industrial productive means, networks of mobile infrastructure construction and maintenance systems, etc. The rail assembly 12 may include an integrated and continuous exterior mechanical or inducting motorization system.

In the particular embodiment shown, the rail assembly 12 includes a removable shield 26 which covers the opening 22 when the displacement device 14, 114 is not circulating through the rail assembly 12, for example to allow a conventional wheeled vehicle to roll over the rail assembly 12, to limit the penetration of debris or liquid through the opening 22, and/or to act as an aesthetic and security measure. The removable shield 26 is shown here as two complementary panels 28 each covering a respective rail 18 and each engaged to the exterior of the rail through an appropriate pivot connection 30, but other configurations may also be possible. The removable shield 26 opens as the displacement device 14, 114 circulates, for example through engagement of the shield 26 with a portion of the displacement device 14, 114 and/or of the transportation device 16. Alternately, the removable shield 26 may be omitted.

The rails 18 may also include side openings at regular interval, positioned and sized so as not to interfere with the displacement of the device 14, for the rejection of debris such as water, snow, ice, sand, mud, rocks, etc.

Although not shown, structural reinforcements may be included in, through and/or along the rail assembly 12. The rail assembly 12 may be installed directly on a ground surface, supported above ground, in water, above water, etc.

Referring to FIGS. 3-4, a displacement device 14 according to a particular embodiment is shown. The displacement device 14 includes a body 40, which in the embodiment shown is generally tubular. The body 40 may include two or more portions interconnected by pivotal joints, such as for example universal-type joints, such as to be able to adapt to greater variations in the shape of the rail assembly 12. In the embodiment shown, the body 40 rotationally supports a main shaft 42 (see FIG. 4) extending therethrough. An engine 44 (see FIG. 3) is also supported by the body 40, and the main shaft 42 is drivingly engaged to the engine 44. In a particular embodiment, the engine 44 is an electrical engine. In the embodiment shown, the engine 44 is spaced apart from the main shaft 42 and is connected thereto through a suitable transmission system 46, e.g. meshed gears, drive belt, dented wheels, chain, electromagnetic mechanism, etc. In another embodiment, the engine may be directly connected to the main shaft 42, for example the engine may be an electrical motor having its rotor directly attached (integrally or not) to the main shaft 42 and its stator surrounding the main shaft 42 and connected (integrally or not) to the body 40.

In another embodiment, the engine may be man-powered. Other configurations are also possible. For example, the engine may be running with solar panels or other passive means of generating electricity, either set on the vehicle and wagons, or set on, by or with the infrastructure. The engine may alternately be a fuel engine, including, but not limited to, an internal combustion engine and/or an engine including fuel cell technology. In a particular embodiment, the fuel is any appropriate type of fuel obtained from recuperation, fermentation and/or putrefaction of organic matter, such as ethanol, hydrogen, or alcohol based fuels whether in gas, liquid or solid state.

The displacement device 14 includes at least one helical propulsion system 47 received in one of the rails 18 in engagement with its inner surface 32 (see FIG. 2). In the embodiment shown, each propulsion system 47 includes a set of angled wheels 48. In the embodiment shown, configured for the rail assembly 12 including two side by side tubular rails 18, the displacement device 14 includes four propulsion systems 47 and accordingly four sets of angled wheels 48, two per rail 18. Each propulsion system 47 includes a rotatable support shaft 50 extending in a radially spaced apart manner with respect to the main shaft 42 and supporting the set of angled wheels 48, such that the set of angled wheels 48 and shaft 50 rotate as a hole about the central axis 51 of the shaft 50. The outer diameter defined by each set of angled wheels 48 corresponds to the inner diameter of the rail 18 such that the wheels 48 contact the inner surface 32 of the rail 18 in a uniform manner in all positions.

Each propulsion system 47 is drivingly engaged to the main shaft 42 through engagement between the rotatable support shaft 50 and main shaft 42. In the embodiment shown, the driving engagement is performed through meshed gears 52 connected to the respective shaft 42, 50. Other configurations are also possible, including, but not limited to, drive belt, dented wheels, chain, electromagnetic mechanism, etc.

Referring to FIG. 5A, the angled wheels 48 are rotatable about an axis W extending at an angle θ which is greater than 0° and smaller than 90° with respect to the longitudinal axis 51 of the rotatable support shaft 50 (also corresponding to the longitudinal axis of the displacement device 14 and as such the direction of travel) to define a helical motion along the inner surface 32 of the respective rail 18, similarly to the thread of a screw. It is understood that θ refers to the smallest angle between the two axes W, 51 as viewed in a plane containing both axes W, 51. In a particular embodiment, the inclination of the wheels 48 is adjustable, for example such as to provide acceleration and braking control function. In a particular embodiment, the inclination of the wheels 48 is adjustable within a range of θ which includes θ at 0° (for example, such as to keep the support shaft 50 rotating when the displacement device 14 is not moving) and/or θ at 90° (for example, to have the wheels 48 freely rotating when the displacement device 14 is moved through other means).

Referring particularly to FIG. 4, in a particular embodiment, the body 40 includes a recess 54 axially aligned with each set of angled wheels 48, such as to allow the angled wheels 48 to rotate closer to the body 40 without interference therewith, for increased compactness.

Referring to FIG. 5B, in the particular embodiment shown, each propulsion system 47 is connected to the body 40 through a tubular support member 56 mounted around the body 40 and extending concentrically therewith. Each support member 56 is circumferentially movable relative to a remainder of the body 40, including the other support members 56. Each support member 56 has an open cross-section across which are connected two longitudinally spaced apart radial arms 58, between which the support shaft 50 is rotationally supported. In the embodiment shown, the set of angled wheels 48 includes three regularly spaced apart wheels 48 connected to the support shaft 50 such as to rotate therewith in addition to be rotatable about their respective angled axis W.

In a particular embodiment, the propulsion systems 47 are grouped in pairs such that the propulsion system 47 of a pair is circumferentially biased in an opposite direction with respect to the other of the pair. Referring back to FIG. 3, a biasing member 60 shown here in the form of a gear located between the adjacent support members 56 of the propulsion systems 47 of the same pair and meshed to adjacent toothed edges of the support members 56 provides for the bias in opposite directions. Other configurations are also possible, for example each propulsion system 47 being connected to the gear through a respective lever arm defined as a rotatable lever connected to the support member 56. In a particular embodiment, the bias may help in stabilizing the position of the displacement device 14 within the rail assembly 12.

In a particular embodiment where the rail assembly 12 includes multiple connecting paths such as shown in FIG. 7, the propulsion systems 47 are movable at least between two positions such as to be movable between adjacent ones of the rails 18. In the embodiment shown, the support members 56 are circumferentially moved by a switching mechanism 62, which includes the biasing member 60. Referring again to FIG. 3, the switching mechanism 62, upon actuation, turns the biasing member 60 to move the support members 56 between a first position, where the angled wheels 48 of the propulsion system 47 are received in one of the rails 18, and a second position, where the angled wheels 48 of the propulsion system 47 are received in another one of the rails 18.

For example, in a particular embodiment and with reference to FIG. 7, each path is defined by two side by side rails and a junction between two paths is defined by three (or more) adjacent rails. The propulsion systems 47 may be movable to a third position where all angled wheels 48 are circumferentially aligned with one another and received in a same one of the rails, for example the central rail 18c. At the location where a third rail 18' merges with the two side by side rails 18, the support members 56 may be moved such that both sets of wheels 48 of the same pair of propulsion systems 47, initially contained in different ones of the two side by side rails 18 in their first position, are first all received in the central rail 18c, and then are each received in one of the third rail 18' and the central rail 18c in their second position.

Referring back to FIG. 3, in the embodiment shown, the switching mechanism 62 includes an activation arm 64 interconnecting the biasing member 60 to an actuation system 66, with movement of the activation arm 64 rotating the biasing member 60 to change the circumferential position of the corresponding support members 56. The switching mechanism 62 synchronizes the rotation of the pairs of support members 56.

In the embodiment shown in FIG. 3, the actuation system 66 is an electrical motor. In an alternate embodiment shown in FIG. 6, the actuation system 66 includes a guiding member, for example a guiding wheel 68, engaged to a guide, for example defined by the common wall 20 between the adjacent rails 18, and the height of the guide is varied where the switching mechanism 62 needs to be actuated. The variation of the height of the guiding wheel 68 actuates the biasing member 60. In the embodiment shown, the variation of the height of the guiding wheel 68 pivots a support arm 70 supporting the guiding wheel 68, and the support arm 70 is connected to the activation arm 64 to correspondingly move the biasing member 60.

The switching mechanism 62 can include smart guiding circuits for identification, authorization and/or localization that can interact with complementary guiding means set by the railing infrastructure, for example. The switching mechanism and/or propulsion systems can be remote-controlled, for example based on GPS localization.

Still referring to FIG. 6, in a particular embodiment, the displacement device 14 additionally includes stabilizing wheels 72, 74 extending such as to roll longitudinally with respect to the rail assembly 12, i.e. with their rotational axis extending perpendicularly to the longitudinal axis L of the device 14. Such stabilizing wheels include, in the example shown, wheels 72 contacting the inner surface 32 of each rail 18, and wheels 74 engaged to the threshold of the rail assembly 12, and wheels 76 engaged to the central junction of the rail. In the embodiment shown, the threshold wheels 74 are received in a C-shaped groove defined along the threshold, and the central wheels 76 are received underneath a C-shaped protrusion 75 extending along the central junction of the rail, allowing to retain the displacement device 14 within the rail 18. Similar grooves and/or retention features may be provided at other locations within the rail, for example along the side wall. The stabilizing wheels 72, 74, 76 may help improve stability of the displacement device 14, in particular when the propulsion systems 47 are moved circumferentially to a different rail 18. Some or all of the stabilizing wheels 72, 74, 76 may be linked to the support member 56 such as to provide for a stop against the biasing force provided by the biasing member 60 and help ensure firm contact of the angled wheels 48 with the inner surface 32 of the rail(s) 18 for more efficient helical traction. In a particular embodiment, some or all of the stabilizing wheels 72, 74, 76 are cog wheels which engage a corresponding linear toothed portion of the rail, for example along the threshold, central junction, side wall, etc.

When all the wheels are located inside the rails 18, such configuration may reduce the risks of derailment and allow the transportation system 10 to be more flexible with respect to damage to and/or type of ground surface.

The configuration of the rails 18 may vary along the length of the track, for example the central C-shaped protrusion 75 may be present along only portions of the track, with the remainder of the track having a central wall such for example as shown at 20 in FIG. 2. In this case the central wheel 76 is retractable or otherwise movable for the track portions where the C-shaped protrusion 75 is absent.

In a particular embodiment, the transportation system 10 may include two or more displacement devices 14 interconnected in series, and the biasing member(s) 60 and/or switching mechanisms 62 thereof may interact with one another such as to help synchronize the displacement devices 14 upon switching of paths.

Although not shown, the displacement device 14 may include cleaning devices, for example one or more arms supported in front, aside from or underneath of the displacement device 14 in a relatively fixed or variable position relative thereto and each supporting an appropriately shaped device to expel debris from the rail assembly 12 and/or to engage the protective shield 26 to open it for passage of the displacement device 14. For example, a rotary plate may be received in front of one or each set of angles wheels, rotating together with the wheel set, and shaped to include debris-clearing blades which upon rotation push any debris out of the path of the rotating wheels as well as a functional containment surrounding the debris-clearing blade to let debris directed safely towards the ground; or a debris-clearing arm system may be included, positioned to direct a series of jets, for example air, water and/or sand jets, directed mainly towards the inner railing infrastructure surface while the displacement device is moving therealong.

In a particular embodiment, the displacement device 14 circulates in a single tubular rail 18. Switching of paths can be done similarly to the above description, by moving the angled wheels 48 of each propulsion system 47 to an adjacent rail defining the other path. For example, the junction between two paths may be defined by two side by side rails, and the angled wheels 48 of the propulsion systems 47 are movable between a first position corresponding to all the angled wheels 48 being received in the first rail, and a second position corresponding to all the angled wheels 48 being received in the second rail. For example, the single rail configuration can be appropriate for suspended infrastructure configuration, as well as for devices traveling very fast continuously and to enable perpendicular cross-section passage of the railing infrastructure.

In a particular embodiment, the displacement device 14 can circulate in alternate double and single rail configurations, the two rails blending together at a given switching location, therefore enabling progressive passage of the propulsion systems 47 in different rails of the double rail configuration into an aligned position in a single rail configuration.

Referring to FIG. 8, a displacement device 114 according to an alternate embodiment is shown. This displacement device 114 is configured for a rail assembly 12 including a single tubular rail 18. The sets of angled wheels 148 of each propulsion system 147 are thus supported in a circumferentially aligned manner with respect to one another. Each set includes three angled wheels 148 and a plurality of magnets 149, supported on a rotatable support shaft 150, which is rotationally supported between two support arms 170 radially extending from the body 140 of the displacement device 114. The body 140 rotationally supports the main shaft 142 which is magnetized, and the main shaft 142 is drivingly engaged to the support shafts 150 through an electromagnetic connection. Although not shown, a mechanism may be provided to circumferentially move the support arms 170 to allow the displacement device to move to an adjacent rail defining another path. Recuperation means may be provided to recuperate energy from the electromagnetic drive and use the recuperated energy to drive the main shaft 142.

Figure 10:
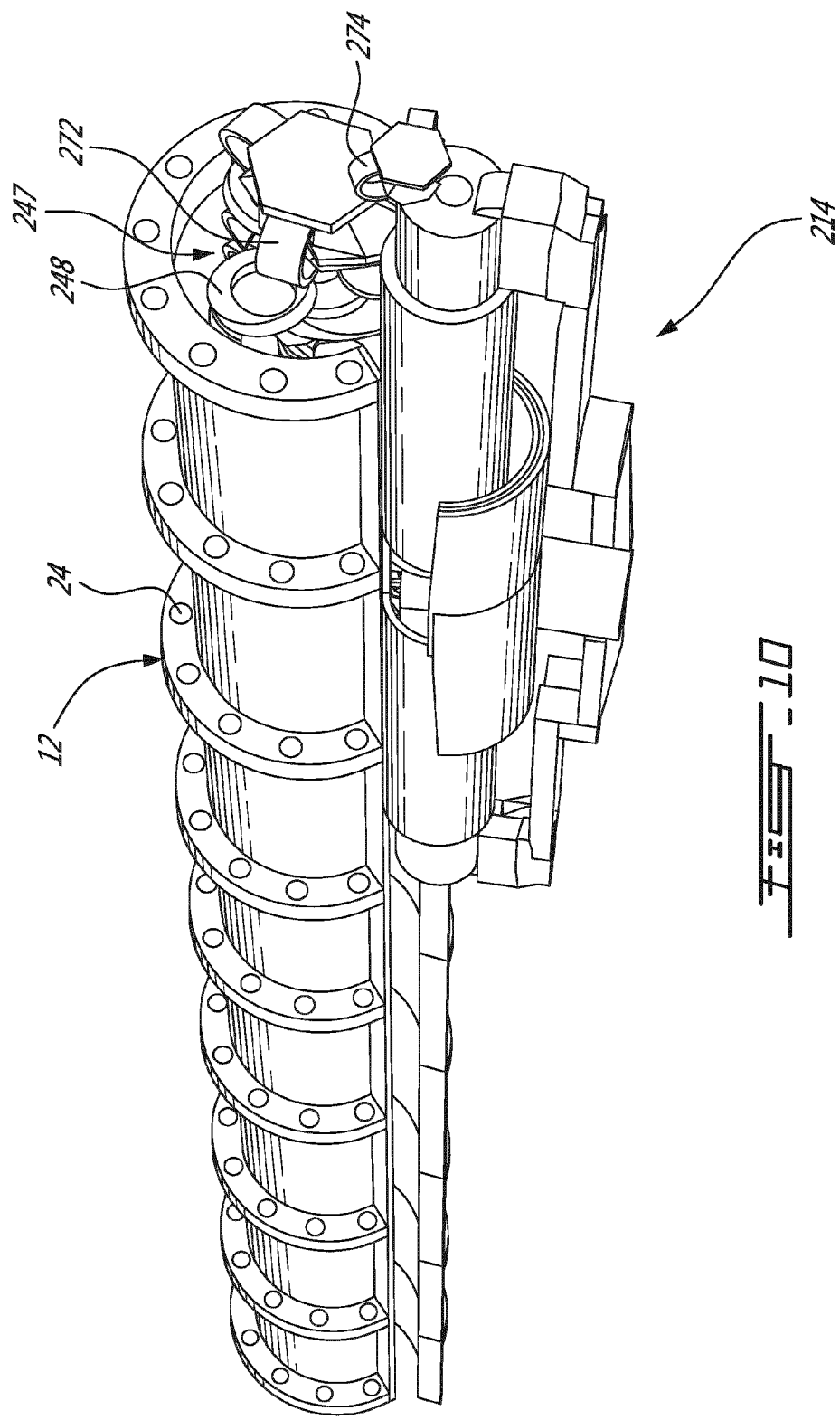
FIG. 10 is a schematic tridimensional view of a displacement device of FIG. 9 engaged in a rail system.

Referring to FIGS. 9-10, a displacement device 214 according to another embodiment is shown. The displacement device 14 includes a body shown here as including two pieces 240, 240' interconnected by a pivoting connection 241, for increased flexibility. In this embodiment, each helical propulsion system 247 includes a set of angled wheels 248 supported by its respective rotatable support shaft 250 extending spaced apart from the body 240, 240' and connected thereto such as to be rotatable about its central axis. Each propulsion system 247 is independently powered through a hub motor having its rotor defined by the respective rotatable support shaft 250. Alternately, each angled wheel 248 may be formed as the rotor of a respective wheel hub motor. Such a configuration may advantageously allow the angled wheels 248 to be used to generate electricity when angled with their axis of rotation at or close to 90° with respect to the longitudinal axis of the rotatable support shaft 250.

As in the previous embodiments, the outer diameter defined by each set of angled wheels 248 corresponds to the inner diameter of the rail 18 such that the wheels 248 contact the inner surface 32 of the rail 18 in a uniform manner in all positions, and the wheels are rotatable about an axis greater than 0° and smaller than 90° with respect to the longitudinal axis of the rotatable support shaft 250. The inclination of the wheels 248 is preferably adjustable to provide acceleration and braking control function, and may be adjustable to include θ being 0 and/or 90°.

As described above, the propulsion systems 247 are in a particular embodiment circumferentially movable relative to one another, for example between at least between two positions such as to be movable between adjacent rails 18, and biased in pairs circumferentially away from one another. In a particular embodiment, the body portions 240, 240' rotate with respect to one another to achieve this relative movement. In another embodiment, each propulsion system 247 is connected to a support member rotationally received within the respective body portion 240, 240', with the body portions 240, 240' remaining in fixed position relative to one another. Any of the above described biasing and/or switching mechanisms or any other adequate type of biasing and/or switching system can be used.

Stabilizing wheels 272 are provided adjacent each set of angled wheels 248, the stabilizing wheels 272 rotating about a fixed axis extending perpendicularly to the axis of the rotating shaft 250. Threshold stabilizing wheels 274 are also rotationally engaged to the body 240, 240'.

Although the helical propulsion systems 47, 147, 247 have been described as including a set of angled wheels, it is understood that in alternate embodiments, including in all of the embodiments described above, the helical propulsion systems may be any other appropriate type of helical propulsion systems, including, but not limited to, paddle or blade propulsion systems for e.g. a liquid environment, levitation and/or magnetic propulsion elements as driven by an inductor system, etc. The helical propulsion systems may include two or more types of drive mechanisms, for example angled wheels and blade or paddles, for example for amphibious propulsion.

In addition, it is understood that the transportation system 10 may include displacement devices 14 having a non-driven propulsion system engaged in the rails, and pulled or pushed by the displacement device(s) 14 having the driven propulsion system(s), e.g. wagons in a train-like assembly. Such non-driven propulsion systems may include non-helical systems, for example wheels rotating along an axis perpendicular to that of travel and engaging the inner surfaces of the rails. The non-driven propulsion systems may also be circumferentially movable relative to one another, for example between at least between two positions such as to be movable between adjacent rails 18, and biased in pairs circumferentially away from one another.

The transportation device 16 may take any appropriate shape, as a function of the load being carried. For example, it may simply be a flat platform on which equipment or cargo may be loaded, or it may be more complex, e.g. a vehicle carried by the displacement device 14, 114. It can also include a platform on which a vehicle is attached.

Figure 11:
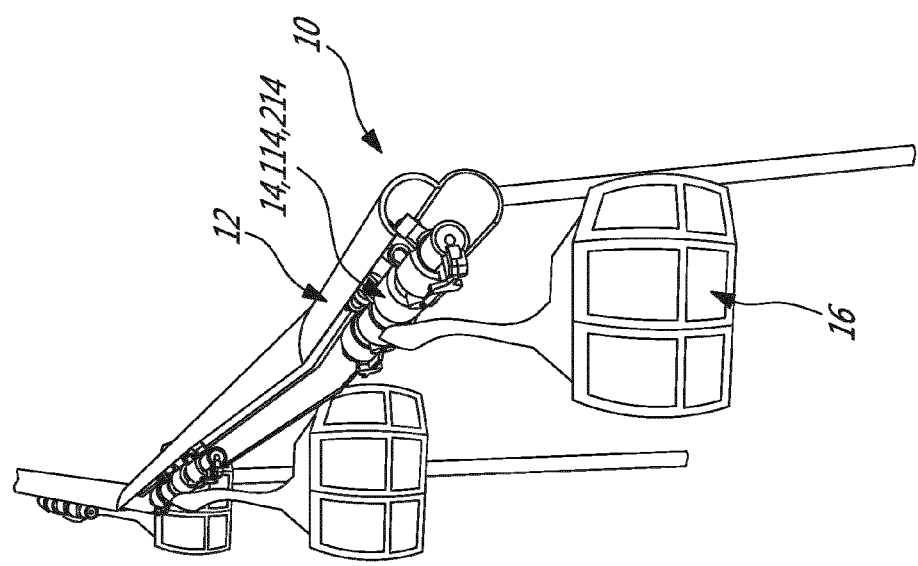
FIG. 11 is a schematic tridimensional view of a transportation system in accordance with another particular embodiment.

For example, in FIG. 1, two types of transportation devices 16 are shown, similar to a train and an automobile; FIG. 11 shows a transportation device 16 corresponding to a cable-car, and FIG. 12 shows a transportation device 16 corresponding to an elevator platform. Non-limiting examples of possible transportation devices 16 which can be used alone or in combination include vehicles such as wagons (train, subway, monorail, etc.), cars, trucks, aircraft, spaceships, boats, submarines, busses, tramways, first-aid evacuation platforms, other types of platforms, cabins, roller coasters and other amusement park rides, toys, gliders, cable-cars, zip cars, hovercrafts, stair lifts, chairlifts, other types of lifts, ladders, wheelchairs, funiculars, and other implements, whether similar to or different from those listed, and whether open or closed, adapted to receive/move passengers and/or animals; containers or other implements adapted to receive and/or carry any type of goods (in gas, liquid or solid form) such as tanks, wheelbarrows, trolleys, bins, wagons; movable tools such as cranes, movable gateways, hoists, harvesters, mowers, balers, grapples, drills, other construction tools, robotic arms, movable supports to which tools can be attached; other movable elements such as sluice gates, escalators, elevators, impellers, conveyors; etc.

The transportation system 10 can thus be used to automatically transport goods, animals and/or people over short, medium and long distances.

The transportation system 10 can be used for transportation along a horizontal or substantially horizontal plane (e.g. along a ground surface), along an inclined plane (e.g. up and down a slope), along a vertical or substantially vertical plane (e.g. elevator inside or along a structure), or combinations thereof. The transportation device 16 may be transported on top of the rail assembly 12 (as shown in FIG. 1), under the rail assembly 12 (as shown in FIG. 11) or, when the rail assembly 12 extends vertically, along the rail assembly 12 (as shown in FIG. 12).

The transportation system 10 can be used on land, underground, in or on water, or in the air or space, and in combinations thereof; for example, the transportation device 16 may be an amphibious cabin adapted to receive passengers, movable both over land and over or in water by the displacement device 14.

The transportation system 10 can be used in replacement of or together with conventional land transportation, including transportation on rails (e.g. trains). For example, existing rails can be used as support for the installation of the rail assembly 12.

The transportation system 10 can thus provide a means of transportation which is accessible, adaptable to a variety of speeds, steepness, scales, weights carried and/or volumes carried with infrastructure which is relatively simple to establish.

In a particular embodiment, the transportation system 10 may allow for a reduction of the use of fossil fuel through replacement and recuperation of vehicles which would otherwise require fossil fuel to function, such as automobiles, trains, buses, etc.

Advantageously, in a particular embodiment, the tubular rail assembly 12 may require less space on the ground than train rails, notably when suspended from elevated structures.

In a particular embodiment, the transportation system 10 generates a noise level which is very low and lower than the usual noise levels generated by trains, subways and similar transportation systems. In a particular embodiment, the transportation system 10 requires less power to run than the usual power levels required for trains, subways and similar transportation systems.

In a particular embodiment, the displacement device is connected to a transportation device which supports a second rail assembly which in turn receives a second displacement device connected to a second transportation device, thus providing for increased possibilities in displacement of the second transportation device.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A transportation system comprising:
   a rail assembly including along at least part of a length thereof at least two tubular rails extending side by side and each having an open circular cross-section;
   a movable displacement device having:
      a body,
      at least one engine,
      at least one helical propulsion system drivingly engaged to the at least one engine, each propulsion system being located in a first position received in one of the rails and engaged to an inner surface thereof, and being movable between the first position and a second position where the propulsion system is received in another one of the rails and engaged to an inner surface thereof, and
      a switching mechanism engaged to each one of the at least one helical propulsion system for movement between the first and second positions; and
   a transportation device located outside of the rail assembly, attached to the displacement device for displacement therewith.

2. The transportation system as defined in claim 1, wherein the at least one engine includes an engine supported by the body, the displacement device including a main shaft rotationally supported by the body and drivingly engaged to the engine, each propulsion system being drivingly engaged to the main shaft.

3. The transportation system as defined in claim 2, wherein each helical propulsion system includes a rotatable support shaft spaced apart from the body and a set of rotatable angled wheels supported by the support shaft such as to be rotatable therewith about a central axis of the support shaft, each support shaft being drivingly engaged to engine, the angled wheels of each set of rotatable angled wheels being rotatable about a respective axis extending at an angle greater than 0° and smaller than 90° with respect to the central axis of the support shaft to define a helical motion along an inner surface of the rails.

4. The transportation system as defined in claim 1, wherein each helical propulsion system includes a rotatable support shaft spaced apart from the body and a set of rotatable angled wheels supported by the support shaft such as to be rotatable therewith about a central axis of the support shaft, the at least one engine including a respective hub motor associated with each rotatable support shaft, the angled wheels of each set of rotatable angled wheels being rotatable about a respective axis extending at an angle greater than 0° and smaller than 90° with respect to the central axis of the support shaft to define a helical motion along the inner surface of the rails.

5. The transportation system as defined in claim 3, wherein an inclination of the angled wheels of each set of rotatable angled wheels is adjustable such as to have a variable angle between a wheel axis and a longitudinal axis.

6. The transportation system as defined in claim 5, wherein the angle between the wheel axis and the longitudinal axis is adjustable to a value of 0° and/or 90°.

7. The transportation system as defined in claim 1, wherein the switching mechanism includes a guiding member engaged to a guide defined in the rail assembly, the height of the guide varying along the rail assembly, the height variation of the guiding member actuating the switching mechanism.

8. The transportation system as defined in claim 1, wherein the rail assembly includes along the part of the length thereof a third rail, each propulsion system being also movable to a third position where each propulsion system is received in the third rail.

9. A displacement device receivable within an open tubular rail, the displacement device comprising:
  a body having a longitudinal axis in use corresponding to a longitudinal axis of the open tubular rail;
  at least one pair of support members engaged to the body and circumferentially movable with respect thereto, each support member supporting a driven helical propulsion system spaced apart from the body and configured to be engaged to an inner surface of the open tubular rail; and
  a biasing member circumferentially biasing the support members of each pair in opposite directions from one another.

10. The displacement device as defined in claim 9, further comprising an engine supported by the body, the displacement device further including a main shaft rotationally supported by the body and drivingly engaged to the engine, each propulsion system being drivingly engaged to the main shaft.

11. The displacement device as defined in claim 10, wherein each helical propulsion system includes a rotatable support shaft rotationally supported by the support member spaced apart from the body and a set of rotatable angled wheels supported by the support shaft such as to be rotatable therewith about a central axis of the support shaft, each support shaft being drivingly engaged to engine, the angled wheels of each set of rotatable angled wheels being rotatable about a respective axis extending at an angle greater than 0° and smaller than 90° with respect to the central axis of the support shaft to define a helical driving motion.

12. The displacement device as defined in claim 9, wherein each helical propulsion system includes a rotatable support shaft rotationally supported by a support member spaced apart from the body and a set of rotatable angled wheels supported by the support shaft such as to be rotatable therewith about a central axis of the support shaft, at least one engine including a respective hub motor associated with each rotatable support shaft, the angled wheels of each set of rotatable angled wheels being rotatable about a respective axis extending at an angle greater than 0° and smaller than 90° with respect to the central axis of the support shaft to define a helical driving motion.

13. The displacement device as defined in claim 11, wherein an inclination of the angled wheels of each set of rotatable angled wheels is adjustable such as to have a variable angle between the wheel axis and the longitudinal axis.

14. The displacement device as defined in claim 13, wherein the angle between the wheel axis and the longitudinal axis is adjustable to a value of 0° and/or 90°.

15. The displacement device as defined in claim 9, wherein the biasing member includes a toothed member meshed with complementary teeth provided on the support members of the respective pair.

16. The displacement device as defined in claim 9, wherein each support member is tubular and surrounds the body.

17. The displacement device as defined in claim 9, wherein each support member is circumferentially movable between first and second positions, the support members of each pair having different relative positions with respect to one another in the first and in the second positions.

18. A displacement device receivable within an open tubular rail comprising:
  an elongated body having a longitudinal axis in use corresponding to a longitudinal axis of the open tubular rail;
  at least one tubular support member surrounding the body and connected thereto such as to be circumferentially movable with respect thereto, each support member rotationally supporting a support shaft spaced apart from and drivingly engaged to a main shaft, the support shaft supporting a set of angled wheels being rotatable about an axis extending at an angle greater than 0° and smaller than 90° with respect to the longitudinal axis of the body to define a helical driving motion, the angled wheels being drivingly engaged to at least one engine and configured to be engaged to an inner surface of the open tubular rail; and
  a switching mechanism engaged to each support member for actuating the circumferential movement thereof.

19. The displacement device as defined in claim 18, wherein the at least one engine includes an engine supported by the body, the displacement device further including a main shaft rotationally supported by the body and drivingly engaged to the engine, each rotatable support shaft being drivingly engaged to the main shaft to drive rotation of the angled wheels.

20. The displacement device as defined in claim 18, wherein the at least one engine includes a respective hub motor for each set of angled wheels, the rotatable support shaft of each set of angled wheels forming part of a rotor of the respective hub motor to drive rotation of the angled wheels.

21. The displacement device as defined in claim 18, wherein an inclination of the angled wheels of each set of angled wheels is adjustable such as to have a variable angle between the wheel axis and the longitudinal axis.

* * * * *